United States Patent [19]

Kirkland

[11] Patent Number: 4,990,852
[45] Date of Patent: Feb. 5, 1991

[54] AUTOMATIC CLASSIFIER FOR ELECTRIC WIRE DETECTOR

[75] Inventor: James L. Kirkland, Panama City, Fla.

[73] Assignee: United States of America as represented by the Secretary of the Navy, Washington, D.C.

[21] Appl. No.: 395,321

[22] Filed: Sep. 7, 1973

[51] Int. Cl.$^5$ .................... G01V 3/08; G01R 19/00
[52] U.S. Cl. ................................ 324/326; 324/67
[58] Field of Search .................... 324/67, 3, 7, 8; 343/7.3

[56] References Cited

U.S. PATENT DOCUMENTS

| | | | |
|---|---|---|---|
| 3,020,470 | 2/1962 | Shawhan et al. | 324/3 |
| 3,066,256 | 11/1962 | Rasor | 324/67 |
| 3,281,660 | 10/1966 | Stodenick | 324/3 |
| 3,490,032 | 1/1970 | Zurflueh | 324/8 |
| 3,526,831 | 9/1970 | Smith | 324/3 |

OTHER PUBLICATIONS

M. I. Skolnik, *Radar Handbook*, McGraw-Hill, 1970, pp. 20-2 to 20-4.

Primary Examiner—Gregory C. Issing
Attorney, Agent, or Firm—Harvey David; John Becker; Sol Sheinbein

[57] ABSTRACT

Object detecting and classifying apparatus is disclosed wherein signals, resulting from electromagnetic coupling between a search unit and an elongated, narrow, conductive object, are processed so as to provide automatic indication of detection of an object of the type mentioned. The apparatus discriminates against false indications from background and spurious signals and against signals from objects of other types by utilizing search unit means that produces successive signals having predetermined time relation to one another only when an object of the class sought is crossed, together with signal processing logic means responsive thereto, and recording and/or indicating means responsive to the logic means.

10 Claims, 1 Drawing Sheet

AUTOMATIC CLASSIFIER FOR ELECTRIC WIRE DETECTOR

DISCUSSION OF THE PRIOR ART

In the case of mine control wires, or of other elongated conductors such as pipes, the general direction in which they are likely to run is known and the searching is done by dragging appropriate detector means along a path or course that is substantially normal to the expected run of the wire or other object. Several detection techniques and apparatus have been described in copending patent applications Ser. No. 632,145, filed Apr. 10, 1967, and Ser. No. 354,560, filed Apr. 20, 1973, assigned to the assignee hereof, to which reference may be had for detailed descriptions of the technique and apparatus concerned. Suffice it to say for this discussion that each relies on electrical or electromagnetic coupling between a searching element, such as a coil or antenna, or a plurality of spaced coils or antennas, and the object being searched for. The coupling is effected by radio frequency energy either emanating from the object being sought and received by the search coil or coils, or emanating from the searching element and received by the object re-radiated into air by an above water portion of the object and detected by a suitable radio receiver. When the searching is carried out at speeds that are satisfactory for covering large areas, the signals generated by passing of a search element over a wire, for example, are quite short and are difficult for an operator to distinguish from static or other spurious signals.

SUMMARY OF THE INVENTION

The present invention aims to overcome many or all of the foregoing disadvantages or shortcomings of the prior art object detection systems, particularly as to the ability to classify returns as being from an object of predetermined characteristics, e.g., an elongated, narrow, conductor such as a mine control wire. This, the invention aims to do, through the provision of signal processing and logic circuitry that relies on predetermined sequences of electromagnetic coupling events between search units and the object.

With the foregoing in mind, it is a principal object of the invention to provide improved apparatus for the detection and classification of elongated, narrow, conductive objects such as wires.

Another object of the invention is to provide object detection and classification apparatus wherein one or more search units provide a plurality of signal characteristics in a predetermined time sequence when an object of the class sought is passed by the search unit, the apparatus including logic circuitry that produces an output signal only when those signal characteristics occur in said predetermined time sequence.

Yet another object of the invention is the provision of detection and classification apparatus of the foregoing character wherein one or more of a plurality of characteristic signals from search unit means are amplified, detected, time delayed by an amount that is a function of the advance of the search unit means, and applied to coincidence means for generation of signals representative of detection of an object of a predetermined class.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
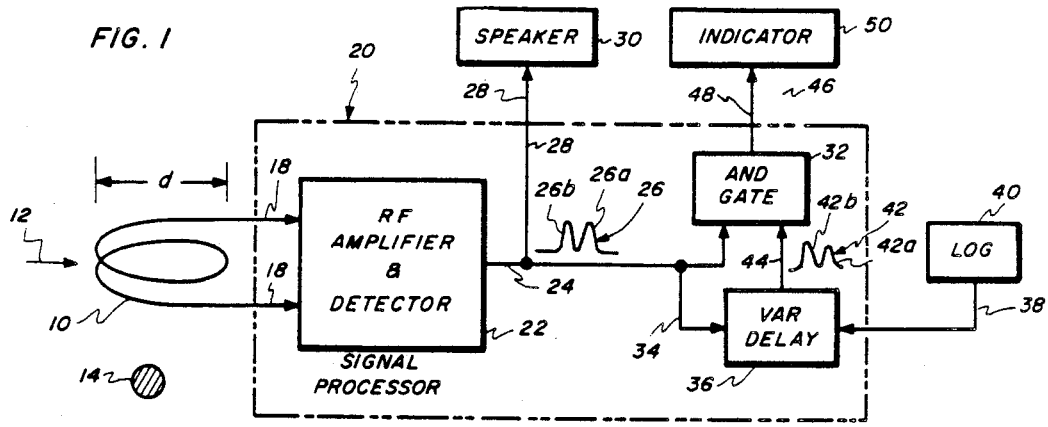
FIG. 1 is a diagrammatic view, in block form, illustrating object detecting and classifying apparatus embodying the present invention.

In the form of the invention illustrated in FIG. 1 there is provided a detector coil 10, comprising one or more turns of insulated wire lying in a substantially horizontal plane and having a coil diameter d. Coil 10 is adapted to be moved along a search path, for example, under water in the direction of arrow 12. This direction is selected to be generally normal to the expected run of an elongated electrically conductive object such as electrical mine control wire 14 for which a search is being made, for example, by towing coil 10 by a suitable vehicle such as a surface vessel or a helicopter. Coil 10 and wire 14 are capable of being electromagnetically coupled to one another by radio frequency electromagnetic energy emanating from the wire, for example, when the wire has portions extending both above and below water and acts as a receiver and rebroadcaster of radio frequency electromagnetic energy. Such energy may be an unmodulated carrier wave, or may be a modulated radio signal from a source such as a commercial broadcast transmitter (not shown). The nature of the coupling is characterized by a distinguishing feature that permits classification of wire 14 as an object of the mentioned type in a manner which will become apparent as this specification proceeds.

Coil 10 is connected, as shown by lines 18 to a signal processor 20 which comprises a radio frequency amplifier and detector 22. Amplifier and detector 22 provides on line 24 an amplified and detected audio frequency voltage signal 26 having an envelope characterized by spaced amplitude peaks 26a and 26b with a null therebetween. Peaks 26a and 26b result from the two maxima of inductive coupling that occur between coil 10 and wire 14, a first of which exists when the wire is substantially tangent to the leading limb of the moving coil and a second of which exists when the wire is substantially tangent to the trailing limb of the moving coil. It will be evident that the time interval t between peaks 26a and 26b is a function of the diameter d of coil 10 and of the speed of movement of the coil. In these regards, t increases with increases in coil diameter but decreases with increases in coil speed.

The amplified and detected output 26 on line 24 is applied, as shown by lines 24 and 28, to an acoustic output means such as a loudspeaker 30 that responds to the amplitude peaks to provide an audible indication that coil 10 is passing over a control wire 14. In the instance where the wire 14 is rebroadcasting amplitude modulated radio frequency electromagnetic energy, say from commercial broadcasting, the speaker output would be characterized by two peak amplitudes of music, voices, or whatever the broadcast program consists of at that time. When the rate or speed of travel of coil 10 is quite slow, the periods of coupling leading up to and following the amplitude peaks are sufficient that voices, music and the like are recognizable. However, when the speed of travel of coil 10 is fast, say 20 knots or more, the speaker output consists of a pair of closely spaced clicks or sound bursts.

Because static, background noise, and other spurious signals are likely to cause the speaker to produce sounds that may be mistaken for detection of a wire, and because the short duration and close timinq of the response due to an actual wire may result in such detection going unrecognized by the operating personnel, the invention provides means for automatically classifying the output signals from amplifier and detector 22.

To that end signal 26 is applied, as shown by line 24 as one input to a coincidence responsive circuit or AND gate 32, and by line 34 to a variable delay means 36. Delay means 36, which is connected, as shown by line 38, to be responsive to the output of a log device 40 that is representative of the speed of the coil towing vehicle and hence of the coil, introduces a time delay in the passage of incoming signals that is equal to time t.

The output 42 of delay means 36 comprises peaks 42a and 42b and is fed, as shown by line 44, as a second input to AND gate 32. AND gate 32, upon coicidence of inputs thereto, is adapted to provide an output signal 46 via line 48 to utilization means, shown in this example as an indicator 50. Other utilization means such as marker buoy releasing mechanisms recorders, and the like may be provided in place of, or in addition to, indicator 50 as will be appreciated by those skilled in the art to which the invention pertains.

In the operation of the embodiment of FIG. 1, delay means 36 is responsive to the output of log 40 to provide a delay substantially equal to the time t that it takes coil 10 to move distance d. By so doing, the lagging peak 26b applied via line 24 to AND gate 32 will coincide in time with the leading peak 42a applied via line 44 to the AND qate. Thereupon a signal 46 will be generated that is substantially more reliable as resulting from a detection of a control wire 14. Moreover, spurious signals from amplifier and detector 22, not characterized by spacing of time t, are rejected.

Figure 2:
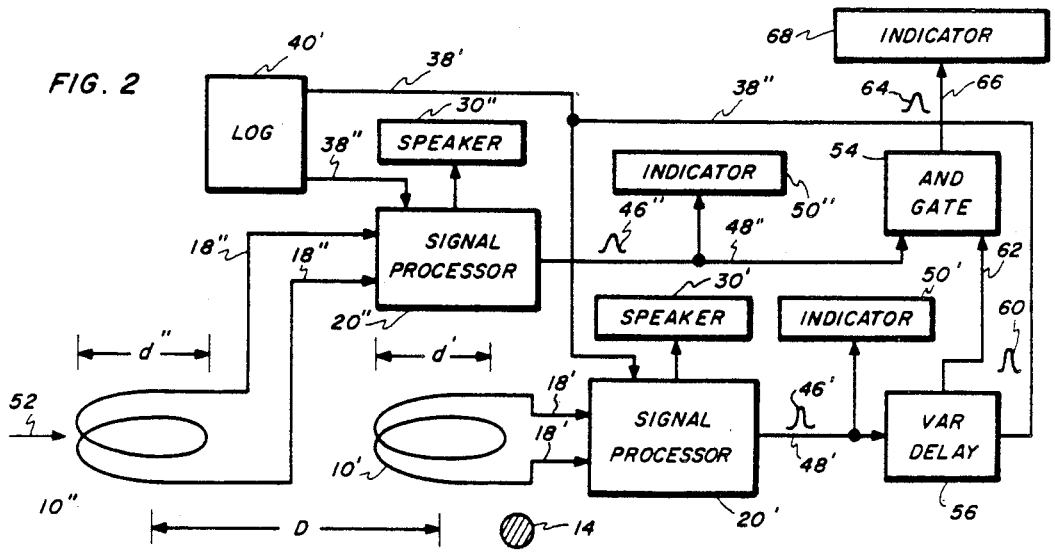
FIG. 2 is a diagrammatic view, in block form, of another embodiment of the invention.

Referring now to FIG. 2 there is illustrated an embodiment of the invention that employs principles and constructions common to the embodiment of FIG. 1, but which offers greater assurance of rejection of false detection signals, and hence a more positive ability to classify a detected object as being of the character sought. In this embodiment, elements or components that are like those of FIG. 1 are given like reference numerals, but with one or more prime marks added for identification in the discussion thereof. Thus, first and second search and detection coils 10' and 10" are provided in spaced relation a distance D apart along a direction of travel indicated by arrow 52. Coils 10' and 10", having diameters d' and d" respectively, are connected by lines 18' and 18" to respective signal processors 20' and 20".

The signal processor 20' and 20" are preferably identical to processor 20 and are responsive to speed related input signals from a log device 40' to provide on respective lines 48' and 48" corresponding output signals 46' and 46".

There will be a time lag between the occurrences of signal 46' and signal 46" that is dependent upon spacing D and the speed of travel of the coils. In order to reinforce the classification of the object detected as being in the character of a wire, the embodiment of FIG. 2 comprises an AND gate 54 having the signals 46" on line 48" applied as a first input. A variable delay means 56 is responsive to the output of log device 40' via line 38", to delay incoming signals 46' via line 48' to be passed as delayed signals 60 via line 62 as the second input to AND gate 54. The delay is dependent upon the speed of movement of coils 10' and 10" and the spacing D therebetween.

Upon coincidence of a signal 46" and a signal 60, AND gate 54 will produce an output signal 64 via line 66 to an indicator 68 or other utilization device. Inasmuch as the output of AND gate 54 depends upon satisfaction of the processing requirements both of the processors 20' and 20", as well as the requirements of AND gate 54 to provide an output signal 64, the system is highly rejective of spurious signals, and, reliable as classifying the output as being indicative of an object having the character of a mine control wire.

In some instances, where as great a definition is not required in the classification processing, processors 20' and 20" may simply comprise amplifiers and detectors that provide outputs on lines 48', 48" that are the average of the outputs of the respective coils 10' and 10". The requirement of delay means and AND gates within processors 20' and 20" is thereby eliminated, with the classification relying upon the existence and proper spacing between the processor outputs 46' and 46" as determined by delay 56 and AND gate 54.

Figure 3:
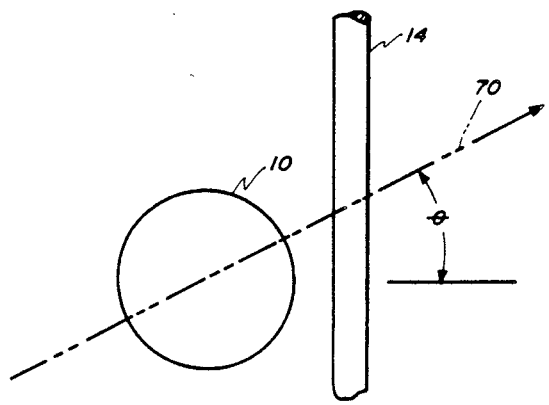
FIG. 3 is a diagrammatic view illustrating angular relationship of the path of travel of a search coil to an object to be detected.

In the foregoing discussions it has been assumed that the coil or coils 10, 10', 10" are moving along a path substantially normal to the run of wire 14 of which detection is the purpose. It will be noted from FIG. 3 that a coil 10 traveling along a path 70 at an angle $\theta$ to the run of wire 14 will have an effective speed of V sin $\theta$ in crossing the wire. This however is readily accommodated for large angles of $\theta$ from 90° to 45°, or a range of V to 0.707 V. When smaller angles are encountered, the lengthening of the period of interception between coils and the wire result in an elongated audible output of speakers 30, 30', or 30" that is readily recognized by trained operators.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Apparatus for detection and classification of an elongated, electrically conductive object such as a wire having a portion running generally in a predetermined direction and lying in a first plane, said apparatus comprising:

a search coil having a predetermined loop diameter and adapted to be moved at a selected speed in a plane substantially parallel to said first plane and along a path that is anticipated will cross said object, said search coil being subject to radio frequency electromagnetic coupling with said object, said coupling being characterized by first and second peaks of coupling when leading and trailing limbs, respectively, of said coil are in overlying relation to said object, said peaks being separated by a time interval that is a predetermined function of said predetermined loop diameter and said selected speed;

radio frequency amplifier and detector means, for providing detected signals having first and second amplitude peaks corresponding to peak coupling between said object and the leading and trailing limbs of said search coil;

AND gate means, having first and second input connections;

delay means, connected between said radio frequency amplifier and detector means and said first input connection, for delaying application of said detected signals to said first input connection for a delay period corresponding to said time interval;

said second input connection being connected to receive said detected signals directly from said amplifier and detector means, whereby upon substantial coincidence of said first and second amplitude peaks at said first and second input connections, said AND gate means provides an output signal; and utilization means, coupled to said AND gate means for effecting a predetermined physical response to said output signal.

2. Apparatus as defined in claim 1, and wherein:

said apparatus further comprises log means for providing speed related signals corresponding to said selected speed; and said delay means is responsive to said speed related signals to automatically effect said delay for a period that is a function of said selected speed.

3. Apparatus as defined in claim 2, and wherein: said utilization means comprises indicator means.

4. Apparatus as defined in claim 3, and further comprising:

acoustic output means, connected to said radio frequency and detector means, for generating audible signals in response to said detected signals.

5. Apparatus for detection and classification of an elongated, electrically conductive object, such as a wire having a portion running generally in a predetermined direction and lying in a first plane, said apparatus comprising.

a plurality of search coils each having a predetermined loop diameter and spaced a predetermined distance from one another, said search coils being adapted to be moved at a selected speed in a plane substantially parallel to said first plane and along a path that is anticipated will cause said searc coils to sequentially cross said object, said search coils each being subject to radio frequency electromagnetic coupling with said object, said coupling being characterized by electrical signals in said coils having first and second maximums of signal strength when leading and trailing limbs, respectively, of a given search coil pass through overlying relation to said object;

a plurality of coil signal processing means, each coupled to a respective one of said search coils and responsive to occasions of said first and second maximums of signal strength, when separated by a time interval that is a predetermined function of said loop diameters and said selected speed, for providing successive object detection signals that are peculiar to said plurality of search coils passing said object;

object detection signal processing means, connected to said coil signal processing means, for providing an output signal when a plurality of said object detection signals occur in a predetermined time relationship to one another; and utilization means, coupled to said object detection signal processing means, for providing an object classification response to said output signal.

6. Apparatus as defined in claim 5, and wherein each of said plurality of coil signal processing means comprises:

radio frequency amplifier and detector means for providing, from said coil signal maximums, detected signals having first and second amplitude peaks corresponding to maximum coupling between a respective one of said coils and said object;

coincidence gate means having first and second input connections;

delay means connected between said first input connection and said radio frequency amplifier and detector means, for delaying application of said first amplitude peak to said first connection for a period corresponding to said time interval;

said second input connection being coupled to receive said amplitude peaks directly from said amplifier and detector means, whereby upon substantial coincidence of said first and second amplitude peaks at said input connections, said coincidence gate means provides one of said object detection signals to said detection signal processing means.

7. Apparatus as defined in claim 6, and further comprising:

log means for generating speed signals corresponding to said selected speed;

said apparatus further being characterized by said delay means being responsive to said speed signals to automatically effect a delay period corresponding to said time interval.

8. Apparatus as defined in claim 7, and wherein said object detection signal processing means comprises:

coincidence gate means having a plurality of input connections corresponding in number to said plurality of search coils and said plurality of coil signal processing means;

one of said plurality of input connections being connected to receive directly the object detection signal of one of said plurality of coil signal processing means;

delay means, connected between the remaining of said plurality of input connections and the remaining of said plurality of coil signal processing means, for delaying application of the remaining object detection signals for a period corresponding to said remaining of said plurality of input connections;

whereby said coincidence means of said object detection signal processing means is operative to provide said output signal to said utilization means only when detection of said object has been achieved by all of said plurality of coils.

9. Apparatus as defined in claim 8, and wherein:

said delay means of said detection signal processing means is responsive to said speed signals to automatically effect a delay period that is related to said distance by which said plurality of coils are spaced from one another.

10. Apparatus for detection and classification of an object of the character described, said apparatus comprising:

first and second search coils, each having a predetermined loop diameter and spaced a predetermined distance from one another in a common horizontal plane, said first and second search coils being adapted to be moved at a selected speed in said horizontal plane and along a path that will cause said first and second search coils to sequentially cross said object, said search coils each being subject to radio frequency electromagnetic coupling with said object, said coupling being characterized by first and second electrical signal maximums in said first coil when the leading and trailing limbs, respectively, thereof are in substantial juxtaposition with said object, and by third and fourth electrical signal maximums in said second coil when the leading and trailing limbs, respectively, thereof are in substantial juxtaposition with said object;

first coil signal processing means, coupled to said first search coil and responsive to occasions of said first and second electrical signal maximums, when separated by a time interval that is a function of the diameter of said first coil and said selected speed, for providing a first object detection signal resulting from said first search coil passing said object;

second coil signal processing means, coupled to said second search coil and responsive to occasions of said third and fourth electrical signal maximums, when separated by a time interval that is a function of the diameter of said second search coil and said selected speed, for providing a second object detection signal resulting from said second search coil passing said object;

first and second acoustic output means, connected to said first and second coil signal processing means, respectively, for providing audible output signals corresponding to said first, second, third and fourth maximums;

first and second indicator means, coupled to said first and second coil signal processing means, for providing indication of said first and second object detection signals, respectively;

object detection signal processing means, coupled to said first and second coil signal processing means, for providing an output signal when said first and second object detection signals occur in a predetermined time relationship to one another; and third indicator means, coupled to said object detection signal processing means, for providing an object classification indication in response to said output signal.

* * * * *